Oct. 27, 1970  R. B. ADAMS  3,535,916

FLUID CONTROL SYSTEMS

Filed March 21, 1968   3 Sheets-Sheet 1

INVENTOR
ROBERT B. ADAMS

BY
ATTORNEY

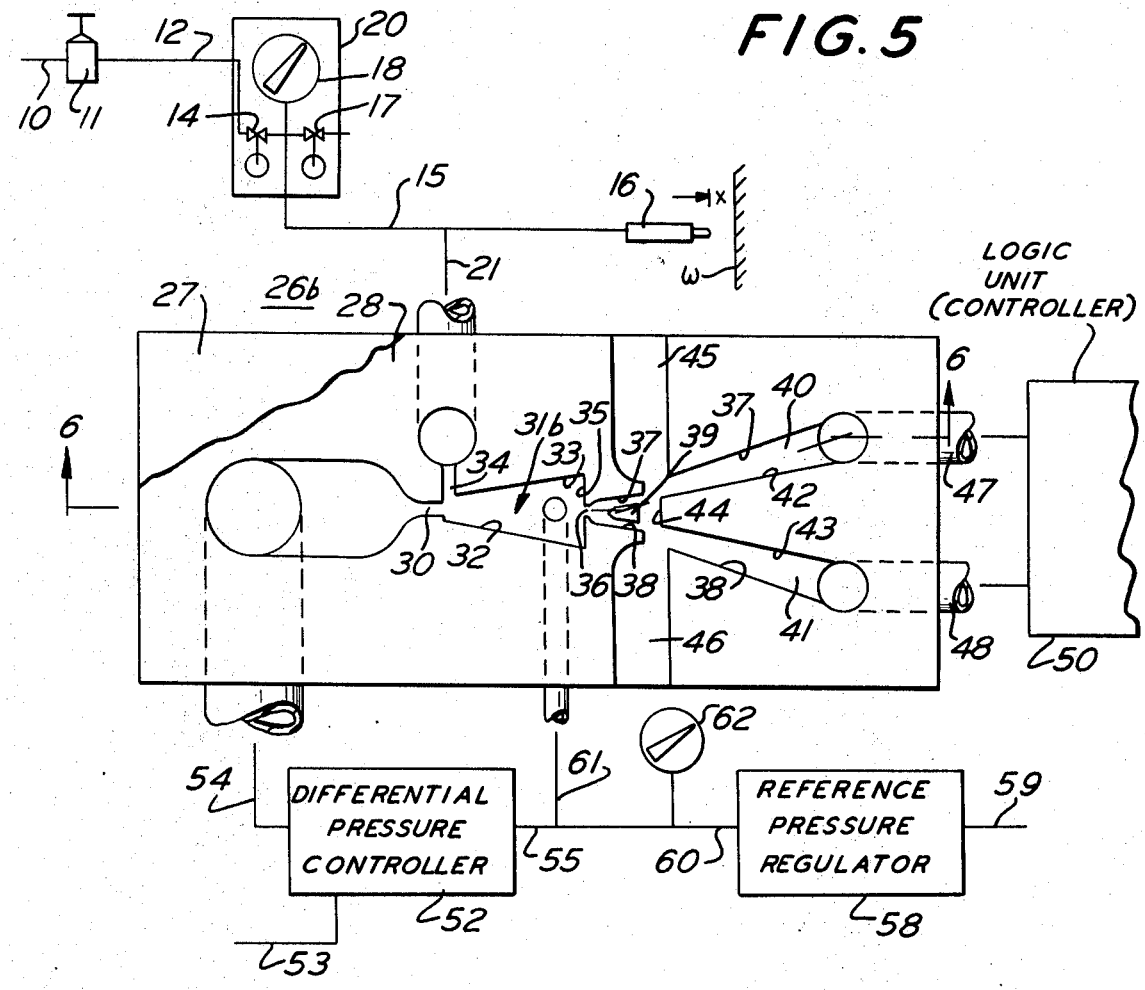

United States Patent Office                              3,535,916
                                                                   Patented Oct. 27, 1970

1

3,535,916
FLUID CONTROL SYSTEMS
Robert B. Adams, Tredyffrin Township, Chester County,
  Pa., assignor to Moore Products Co., Spring House,
  Pa., a corporation of Pennsylvania
    Filed Mar. 21, 1968, Ser. No. 714,949
            Int. Cl. G01b 13/02
U.S. Cl. 73—37.5                                   5 Claims

ABSTRACT OF THE DISCLOSURE

Fluid control systems employing a steering chamber for switching in response to an externally sensed pressure with provisions for manual or remote setting of the sensing level. The systems are applicable to pneumatic dimension gaging circuits. The systems are such that more than one sensing means can be connected to a gaging circuit with adjustment to different set points. The set point can be adjusted independently of and remotely from the gaging circuit i.e. without the need for changing any of the parameters of the gaging circuit. Step pressure change upon switching can be utilized and if desired eliminated.

BACKGROUND OF THE INVENTION

Field of the invention

This invention relates to fluid control systems employing a steering chamber for sensing the pressure level of an external pressure source.

Description of the prior art

It has heretofore been proposed in pneumatic gages, and as in Symnoski et al., U.S. Pat. No. 3,232,095, to employ an interaction chamber with a pressure which is related to the gaging pressure but is close at atmospheric for switching the flow in that chamber. In Symnoski et al., it is not feasible to have the pressure in the interaction chamber close to the pressure at the gaging nozzle.

It has also heretofore been proposed in Reilly, U.S. Pat. No. 3,153,934 to supply fluid both from a pressure source and from a pressure operated load, with a diversion of a portion of the supplied fluid through a restriction and into a divider chamber to control the direction of flow in that chamber and to a single outlet.

Reilly has an electronic output and does not have a fluidic output such as is desired for many purposes.

SUMMARY OF THE INVENTION

It is the principal object of the present invention to provide a fluid control system which is particularly useful for but is not limited to pneumatic dimension gaging circuits having a steering chamber with a jet nozzle flow of low kinetic energy which can be switched by a small flow of fluid into or out through the control port for the jet, in which an adjustment is available for changing the switching level by changing the steering chamber pressure, and in which the major pressure drop is from the steering chamber to the atmosphere.

A steering chamber for purposes of the present invention is a fluid interaction chamber with a single inlet to introduce a power stream therein, the chamber having a single outlet for the delivery of the power stream in selected directions for utilization of the directed flow, the power stream being under the influence of pressure signals applied at control ports in the chamber.

It is a further object of the present invention to provide an improved circuit for pneumatic dimension gaging as well as for other purposes employing a steering chamber and having a simple but effective size adjustment with adjustment of the set point independent of the gaging circuit.

It is a further object of the present invention to provide a fluid control system having a steering or reaction chamber in which the set point can be adjusted by changing the pressure in that chamber either by adjustment of a supply restriction or of a supply pressure regulator.

It is a further object of the present invention to provide a fluid contol system of the character aforesaid in which the step pressure change at the control port upon switching can be eliminated.

It is a further object of the present invention to provide an improved fluid circuit of the character aforesaid which operates at very high speed.

It is a further object of the present invention to provide an improved fluid circuit which permits of connecting more than one sensing means to a gage circuit, the sensing means being adjustable to different points or levels.

Other objects and advantageous features of the invention will be apparent from the description and claims.

BRIEF DESCRIPTION OF THE DRAWING

The nature and characteristics features of the invention will be more readily understood from the following description taken in connection with the accompanying drawings forming part thereof, in which:

FIG. 5 is a diagrammatic view of another fluid control circuit in accordance with the invention;

FIG. 6 is a longitudinal sectional view taken approximately on the line 6—6 of FIG. 5.

It should be, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Figure 1:
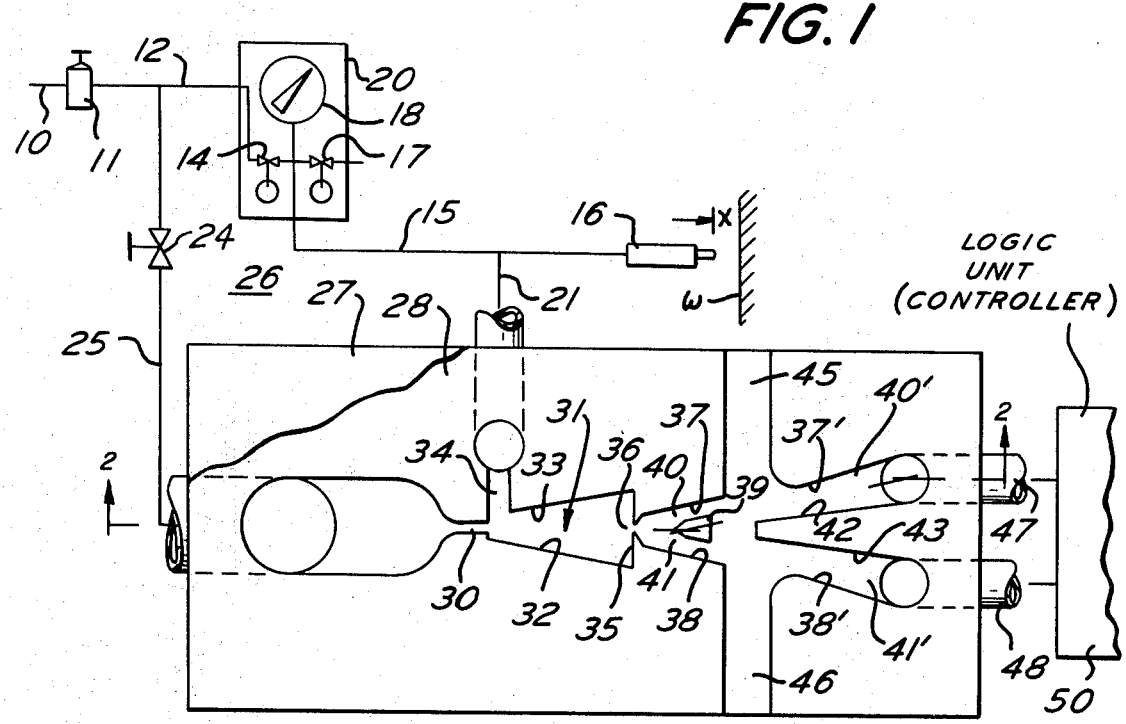
FIG. 1 is a diagrammatic view of a dimension gaging circuit in accordance with the invention.
Figure 2:
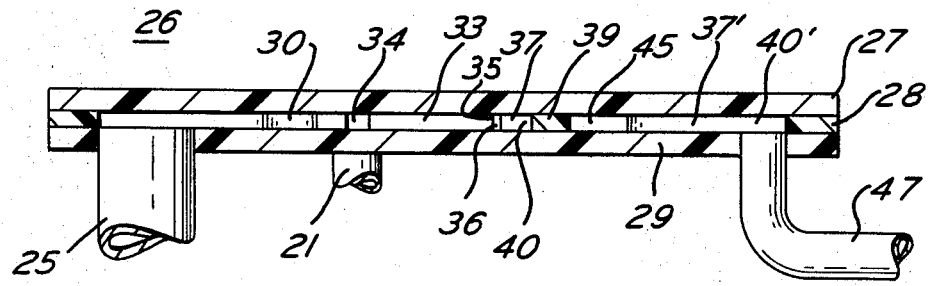
FIG. 2 is a longitudinal sectional view taken approximately on the line 2—2 of FIG. 1.

Referring now more particularly to FIGS. 1 and 2 of the drawings, a connection 10 is provided to a source of fluid, such as air, under pressure which is available through an adjustable pressure regulator 11 to a fluid connection 12. The fluid connection 12 is connected through a variable restriction 14 to a gage circuit fluid connection 15 which extends to a dimension gaging unit 16. The gaging unit 16 can have a nozzle discharging directly against the work W with a dimension $x$ to be gaged, can be a gaging unit such as is shown in U.S. Pat. No. 2,881,528 of C. B. Moore, or can be any other suitable unit by which the distance $x$ can be measured in terms of pressure upstream of the gaging unit 16.

The gage circuit connectioin 15 also has a variable discharge restriction 17 connected thereto and to atmosphere and an indicator 18, such as dial gage responsive to the pressure prevailing in the fluid connection 15. The restrictions 14 and 17 and the indicator 18 can be enclosed within a suitable housing 20. The gage circuit connection 15 is ordinarily short to reduce capacitance effects. The gage circuit connection 15 also has a control connection 21 connected thereto for purposes to be explained.

The fluid connection 12 is connected through a manually or automatically controlled valve 24 which provides a size adjustment, to the supply connection 25 of a steering chamber assembly 26.

The steering chamber assembly 26 can be made of any preferred construction but advantageously includes an upper cover plate 27, an intermediate control section 28 with the desired internal shaping, and a lower cover plate 29, secured together to provide a leak proof construction.

The supply connection 25 is in communication in the intermediate section 28, with a nozzle 30 which communicates with a steering chamber 31. The steering chamber 31 has a diverging side wall 32 preferably offset outwardly from the nozzle 30, the offset being exaggerated in the drawing for purposes of illustration. The chamber 31 has an opposite diverging side wall 33, preferably with an offset outwardly from the nozzle 30 about twice that of the wall 32. The control connection 21 communicates with the chamber 31 through a control port 34 in the side wall 33. The steering chamber 31 has an end wall 35 with a central outlet 36 longitudinally axially aligned with the nozzle 30. The outlet 36 preferably has a width about one half to three quarters of the width of the nozzle 30 so that the ratio of the pressure drop across the outlet 36 to the pressure drop across the inlet nozzle 30 will be greater than 2 and is preferably of the order of 9 for more effective operation.

The intermediate section 28, beyond the outlet 36, has diverging walls 37 and 38 and a divider island 39 therebetween bounding passageways 40 and 41. Delivery passageways 40' and 41' are positioned to receive the fluid streams exiting from the passageways 40 and 41 and have outer walls 37' and 38' and inner walls 42 and 43 which extend to a transverse divider wall 44.

Transverse vent passageways 45 and 46 in the intermediate section 28, and in communication with a fluid sink which may advantageously be the atmosphere at their outer ends, communicate with the passageways 40' and 41' to prevent downstream pressure variations in the passageways 40' and 41' from having any effect in the chamber 31.

The delivery passageways 40' and 41' can be connected by fluid connectors 47 and 48 to any desired device 50, such as a logic unit or controller, for utilizing the signals available in the passageways 40' and 41'.

The steering chamber 31 by virtue of its shape, can support two states of flow, one along wall 32 and the other along wall 33, and no other stable flow pattern exists. Flow along the wall 33 results in flow in the passageway 41 and pressure in connector 48 higher than that in connector 47. Flow along the wall 32 results in flow in the passageway 40 and pressure in connector 47 higher than that in the connector 48.

The pressure effective in control port 34 is effective in switching the flow in chamber 31 from one of the two stable conditions to the other.

Increasing the pressure in the control port 34 is in the direction to switch the flow away from the wall 3 and to the wall 32. A reverse pressure change is in the direction to give reverse switching action.

Fluid supplied from the fluid connection 10 through the fluid connection 12 is available in the gage circuit connection 15. The pressure in that connection is determined by the gaging unit 16 as a measure of the distance or dimension $x$. The pressure in the gage circuit connection 15 is available at the indicator 18 and in the fluid connection 21 to the control port 34.

Fluid is also supplied from the fluid connection 12 through the fluid connection 25 and through the nozzle 30 and into the steering chamber 31.

The average pressure level prevailing in the chamber 31 is determined by the pressure supplied to the nozzle 30. The pressure existing at the control port 34 is determined by the spacing $x$.

Increase of the pressure in the fluid connection 25 increases the pressure required at the control port 34 to produce switching. Accordingly a change of the supply pressure in the fluid connection 25, such as by adjustment of the valve 24, produces a size adjustment.

The pressure required at the control port 34 to produce switching may be either equal to or slightly higher or slightly lower than the pressure in the chamber 31, depending on the relationship, including the respective offsets, between the nozzle 30 and the side walls 32 and 33.

Figure 3:
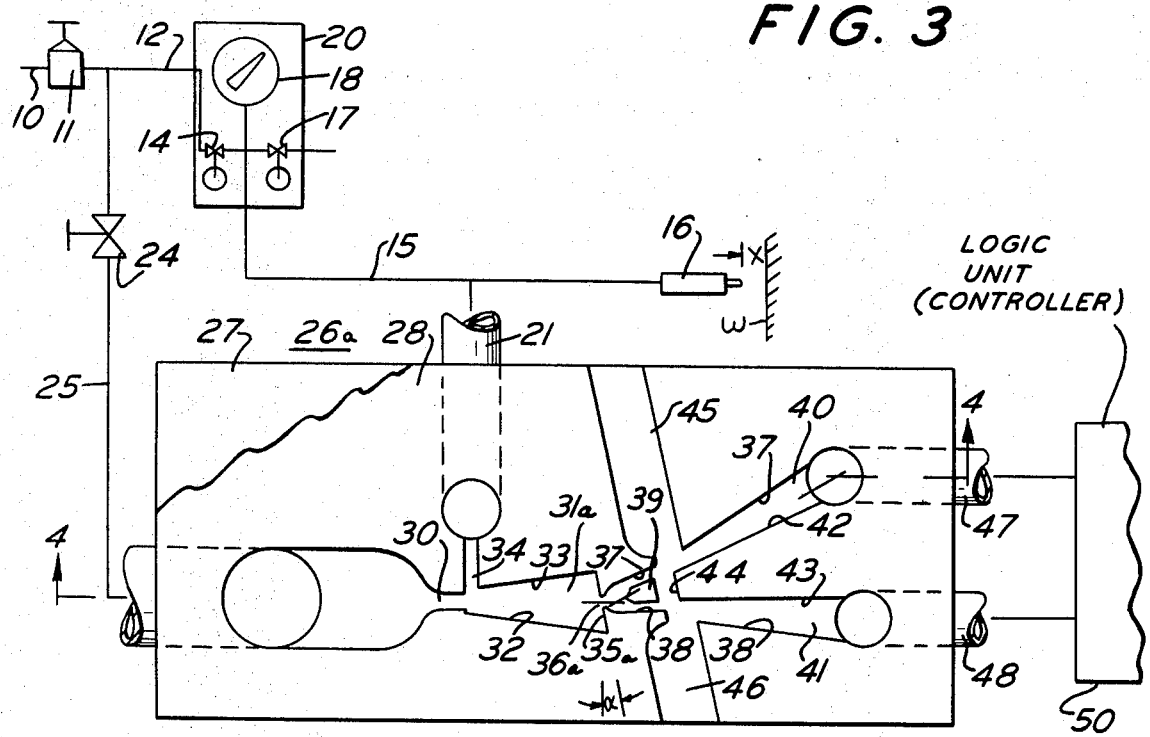
FIG. 3 is a diagrammatic view of another fluid control circuit in accordance with the invention.
Figure 4:
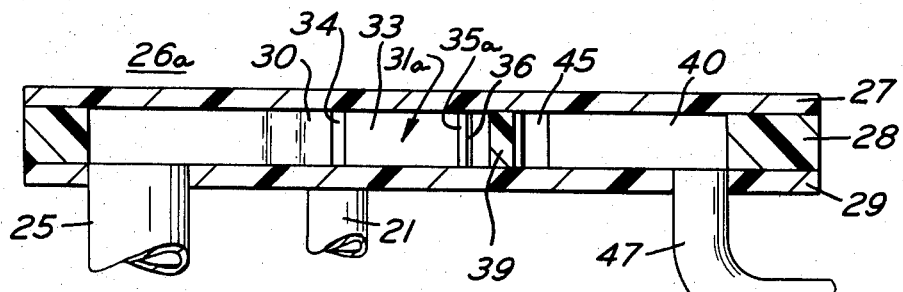
FIG. 4 is a longitudinal sectional view taken approximately on the line 4—4 of FIG. 3.

In the configuration of FIGS. 1 and 2, switching of the jet in the chamber 31 produces a reaction which changes the pressure and flow at the control port 34. For some operating conditions such a reaction may be considered undesirable. The construction of FIGS. 3 and 4 shows one way of minimizing this reaction.

The cause of this reaction can be explained by considering the effect of a dimension change at $x$ in FIG. 1. Consider that the dimension $x$ is larger than that required to produce switching so that the pressure in conduit 15 and control port 34 are below the switching value. As the dimension $x$ decreases the pressure in control port 34 will increase until switching occurs. Immediately prior to switching, the jet from nozzle 30 will be following wall 33. The jet effectively seals the control port 34 from the main body of the chamber 31 and because the control port 34 is exposed to the concave side of the jet it is subject to a pressure lower than that prevailing in the chamber 31 which is exposed to the convex side of the jet.

Immediately after switching the jet is following wall 32 and the control port 34 is now in direct communication with the chamber 31 and is exposed to the higher pressure therein.

The sudden increase of pressure at the control port 34 causes a change of flow in conduit 21 and an increase of the pressure in the conduit 15 even though the dimension $x$ has remained unchanged. It should be noted that in the foregoing explanation it has been assumed that the pressure in the chamber 31 is not appreciably changed by the switching action.

Referring now more particularly to FIGS. 3 and 4, the structure is similar to that of FIGS. 1 and 2 except that the steering chamber 31a is changed so that its end wall 35a is canted at an angle $\alpha$ to the position of the corresponding wall 35 in FIG. 1 in which it is perpendicular to the longitudinal axis of the nozzle 30 and outlet 36.

Because of the canting of the end wall 35a the flow coefficient at the outlet 36a is lower when the jet is attached to the wall 33 than when the jet is attached to wall 32. Because of this difference in the flow coefficient the pressure level in the chamber 31a will be greater when the jet is attached to the wall 33 than when the jet is attached to the wall 32.

If the change of pressure level in the chamber 31 is made equal and opposite to that which occurs in FIG. 1 at the control port 34 then when switching occurs in the structure of FIG. 3 there will be no pressure change at the control port 34 and there will be no corresponding change in the pressure conduit 15 when switching occurs. The angle of canting to achieve such condition is preferably in the range of from 6° to 15°, depending on the proportions of the chamber 31 but larger or smaller angles can be employed to provide either undercompensation or overcompensation as desired.

Referring now more particularly to FIGS. 5 and 6, which permit of remote setting, the connection 10 is provided as before and is connected through the adjustable regulator 11, the fluid connection 12, variable restriction 14 and fluid connection 15 to the gaging unit 16.

A differential pressure controller 52 is provided, having a pressure fluid supply connection 53 to which filtered fluid, such as air under pressure is supplied from any suitable source. The controller 52 has a higher pressure output fluid connection 54, and a lower pressure input fluid connection 55.

A steering chamber assembly 26b is provided with an upper cover plate 27, an intermediate control section 28 with the desired internal configuration, and a lower cover plate 29b, second together to provide a leakproof construction.

The fluid connection 54 is in communication with the nozzle 30, in the intermediate section 28 and nozzle 30 communicates with the steering chamber 31b.

The steering chamber 31b has a diverging side wall 32 and an opposite diverging side wall 33 with a control port 34 downstream of the nozzle 30 to which the fluid connection 21 is connected. The steering chamber 31b has an end wall 35 and outlet opening 36 similar to FIG. 1, together with fluid connections 47 and 48 and vent passageways 45 and 46.

A reference pressure regulator 58 is provided having a pressure fluid supply connection 59 to which filtered fluid, such as air under pressure is supplied from any suitable source. The controller 58 has an output connection 60 which is connected to the fluid connection 55 and to a fluid connection 61 which extends to the steering chamber 31b, so that a predetermined differential pressure can be maintained across the nozzle 30.

A pressure indicator 62, such as a dial gage, can be connected to the fluid connection 60, so that the pressure in the steering chamber 31b can be ascertained and controlled by variation of the reference pressure regulator 58.

The operation of the structure of FIG. 5 is substantially the same as that of FIG. 1 except that the fluid to the nozzle 30 is supplied from the differential pressure controller 52 instead of from the connections 12 and 25 which contain the valve 24.

The differential pressure controller 52 may be chosen to provide sufficient differential pressure across the nozzle 30 so that in the normal operating range the in-flow through nozzle 30 is equal to the out-flow through outlet 36. If there is an imbalance between the in-flow and the out-flow to chamber 31b, the difference will flow in conduit 61 and 60 to the reference pressure regulator 58 which preferably is of a type which can either supply or exhaust fluid to maintain a constant pressure in conduit 60. The chamber 61b may be shaped so that switching occurs when the pressure in control port 34 is substantially equal to that in the main body of the chamber 31b and which is indicated on indicating gage 62. Thus the indicator 62 provides an indication of the switching level which may be adjusted by reference pressure regulator 58 to occur at any desired point on the indicating dial 18.

Figure 7:
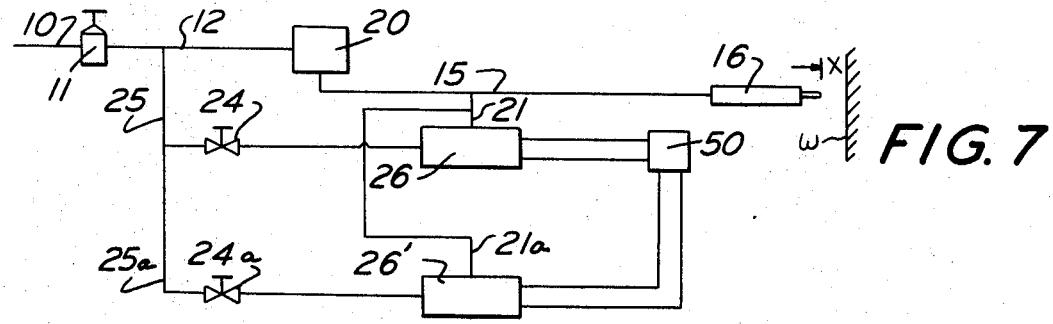
FIG. 7 is a diagrammatic view of a gaging circuit utilizing a plurality of levels of gaging pressures with a plurality of steering chambers.

In FIG. 7 a system is illustrated in which one gaging unit 16 is connected as in FIGS. 1, 3 and 5, to a steering chamber assembly 26, and by the control connection 21a to an additional steering chamber assembly 26'. A supply connection 25a, connected to the supply connection 25, has a control valve 24a therein. The steering chamber assembly 26' is connected to a controller 50. The steering chamber assemblies 26 and 26' can be set by adjustment of valves 24 and 24a to respond to different pressure levels in the control connections 21 and 21a.

What is claimed is:
1. A fluid control system comprising:
a steering chamber having diverging side walls, a supply nozzle, and outlet opening and a control port communicating with said chamber for switching the fluid along either side wall,
separate fluid delivery connections downstream of said outlet opening receiving the fluid through said outlet opening from said respective side walls,
a first source of pressure fluid for the nozzle,
a second source of pressure fluid,
said second pressure source being variable independently of said first source and being connected to said control port,
means for varying said first source of fluid for said nozzle to provide a pressure in said chamber substantially equal to the pressure level at which the pressure from said second pressure source causes switching, and
means to provide a higher pressure drop through said outlet opening for one delivery direction than for another.

2. A fluid control system comprising:
a steering chamber having diverging side walls, a supply nozzle, an outlet opening and a control port communicating with said chamber for switching the fluid along either side wall,
separate fluid delivery connections downstream of said outlet opening receiving the fluid through said outlet opening from said respective side walls,
a first source of pressure fluid for the nozzle,
a second source of pressure fluid,
said second pressure source being variable independently of said first source and being connected to said control port, and
means for varying said first source of fluid for said nozzle to provide a pressure in said chamber substantially equal to the pressure level at which the pressure from said second pressure source causes switching,
said steering chamber having a planar end wall with the outlet opening therein, and
said end wall being canted with respect to the axis of the nozzle.

3. A fluid control system comprising:
a steering chamber having diverging side walls, a supply nozzle, an outlet opening and a control port communicating with said chamber for switching the fluid along either side wall,
separate fluid delivery connections downstream of said outlet opening receiving the fluid through said outlet opening from said respective side walls,
a first source of pressure fluid for the nozzle,
a second source of pressure fluid,
said second pressure source being variable independently of said first source and being connected to said control port,
means for varying said first source of fluid for said nozzle to provide a pressure in said chamber substantially equal to the pressure level at which the pressure from said second pressure source causes switching, and
an additional steering chamber connected to said second pressure source to be sensed for switching at a different level of pressure of said external source.

4. A fluid control system comprising:
a steering chamber having diverging side walls, a supply nozzle, and outlet opening and a control port communicating with said chamber for switching the fluid along either side wall,
separate fluid delivery connections downstream of said outlet opening receiving the fluid through said outlet opening from said respective side walls,
a first source of pressure fluid for the nozzle,
a second source of pressure fluid,
said second pressure source being variable independently of said first source and being connected to said control port,
means for varying said first source of fluid for said nozzle to provide a pressure in said chamber substantially equal to the pressure level at which the pressure from said second pressure source causes switching,
said steering chamber having a pressure port connected thereto between said supply nozzle and said outlet opening,
a third source of fluid pressure connected to said port for controlling the mean pressure within said chamber, and means for controlling said first source of fluid for supplying fluid to the nozzle at a higher pressure level than the pressure from said third source.

5. A fluid control system comprising:

a steering chamber having diverging side walls, a supply nozzle, and outlet opening and a control port communicating with said chamber for switching the fluid along either side wall, separate fluid delivery connections downstream of said outlet opening receiving the fluid through said outlet opening from said respective side walls, a first source of pressure fluid for the nozzle, a second source of pressure fluid, said second pressure source being variable independently of said first source and being connected to said control port, and means for varying said first source of fluid for said nozzle to provide a pressure in said chamber substantially equal to the pressure level at which the pressure from said second pressure source causes switching, said outlet opening being asymmetrically disposed with respect to the side walls to provide a higher pressure drop for one direction through said chamber than for another.

References Cited

UNITED STATES PATENTS

| | | | |
|---|---|---|---|
| 2,881,528 | 4/1959 | Moore | 73—37.5 X |
| 3,153,934 | 10/1964 | Reilly | 73—388 |
| 3,232,095 | 2/1966 | Symnoski et al. | 73—37.5 |
| 3,285,265 | 11/1966 | Boothe et al. | 137—81.5 |
| 3,285,608 | 11/1966 | Lyman | 73—37.7 X |
| 3,313,313 | 4/1967 | Katz | 137—81.5 |
| 3,326,463 | 6/1967 | Reader | 137—81.5 X |
| 3,373,760 | 3/1968 | Adams et al. | 137—81.5 |

S. CLEMENT SWISHER, Primary Examiner

U.S. Cl. X.R.

137—81.5